Feb. 12, 1952      F. A. NIEMANN      2,585,578
DECIMAL INDICATOR
Filed May 9, 1945
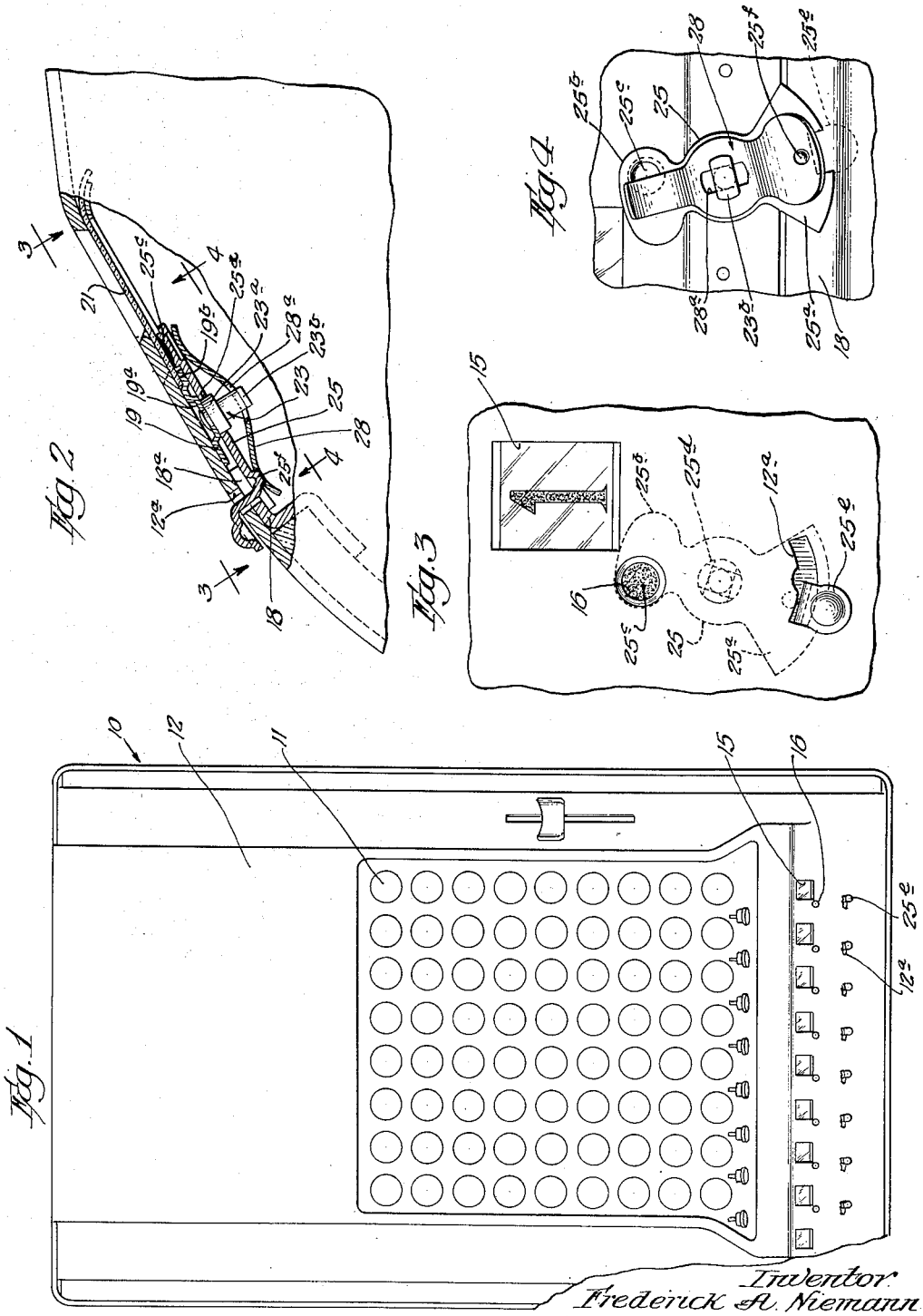

Patented Feb. 12, 1952

2,585,578

UNITED STATES PATENT OFFICE 2,585,578

DECIMAL INDICATOR

Frederick A. Niemann, Chicago, Ill., assignor to Felt & Tarrant Manufacturing Company, Chicago, Ill., a corporation of Illinois Application May 9, 1945, Serial No. 592,893

6 Claims. (Cl. 116—134)

This invention relates in general to calculating machines and has more particular reference to decimal indicators for such machines.

An object of the invention is the provision of a novel decimal indicator as an accessory of calculating machines to enable the operator to set up a decimal indication to the left of and adjacent the displayed figure of any desired numeral wheel of such a machine.

Another object is to provide such an indicator closely adjacent the corresponding total indication and selectively operable to locate the decimal relative to the denominational order of any number indicated or registered in the machine so as to approximate decimal location in printed, typed, or written figures whereby the eye of the operator immediately identifies the decimal point in his indicated total or final result.

Another object is to provide a decimal indicator which may be quickly attached to or detached from the casing of the apparatus or machine with which it is used.

Another object resides in the provision of such an indicator or a portion thereof marked or colored for decimal indication, such portion being movable to and from visible alignment with a corresponding opening.

Other objects reside in the details and arrangement hereinafter described and shown in the accompanying drawings in which:

Fig. 1 is a plan view of a portion of a calculating machine constructed for and equipped with my decimal indicators;

Fig. 2 is a vertical section through a portion of the casing and one of the indicators, this figure being drawn to an enlarged scale;

Fig. 3 is a plan view of one of the indicators and numeral sight openings viewed along the plane 3—3 of Fig. 2;

Fig. 4 is an inverted plan view along the plane 4—4 of Fig. 2.

Illustrative of the invention, a multi-order calculating machine is shown in the drawings with usual depressible digital keys 11 arranged in denominational rows transversely of the machine. A casing encloses the mechanism of the machine and is generally indicated by numeral 12. At the foot of each row of keys the casing is provided with a numeral opening or window 15 overlying the total or result indicating or register wheel for the corresponding row of keys. Closely adjacent and slightly to the left of each window 15 is a decimal opening 16. On the under surface of the casing is provided a transverse bracket 18. The bracket 18 is provided with cutouts or recesses 18a at its upper edge to permit movement of the decimal indicators, hereinafter described. Also extending across and secured to the under face of the casing is the plate 19 having a raised portion 19a forming a recess with the casing and an outer portion 19b forming a slot with the casing in which is slidably mounted a transparent panel 21 of Celluloid or the like which underlies the openings 15 and 16.

Pivots 23 are secured to the plate 19 and headed into apertures therein in the recesses formed by the raised portions 19a, as illustrated in Fig. 2. These pivots are each provided with an enlarged circular shoulder 23a and at their lower ends are each provided with a transverse, elongated, rectangular head 23b (see Fig. 4).

Indicator members 25 are provided for each decimal opening. These indicator members 25 are provided with a segmental portion 25a at one end and are formed with their other ends ovate or curved as indicated at 25b. At one side of the end 25b a portion 25c is struck up or raised on each indicator member to form a boss which is preferably colored or marked for decimal indication. The central portion of each member 25 is apertured at 25b to fit closely around and rotate upon the shoulder 23a of the corresponding pivot. A portion of each segmental end 25a is struck up and then bent outwardly to form the finger 25e, these fingers being projected through the arcuate slots 12a in the casing. These figures are easily engageable by a finger of the operator for pivotal movement of the corresponding indicator member to and from the position in which the boss 25c underlies and is visible through the corresponding opening 16. With the boss distinctively marked or colored and the balance of the end 25b neutrally colored or blanked, or of the same color as the casing, it will be apparent that decimal indication is positive and quickly determined.

To secure each indicator member in operative position I provide spring members 28 of curved construction, the ends being slightly bowed. A central elongated slot 28a is provided in each member 28 of such size as to permit its passage over and beyond the head 23b, after which partial rotation of the spring member will bring the slot 28a across or outward the head 23b whereby it is retained in position bearing upon and pressing against the corresponding indicator member 25 to hold the same frictionally against the portion 19a of plate 19 (see Fig. 2). To transmit rotative movement to the spring member 28 when the corresponding indicator member 25 is rotated, a portion or lug 25f is extruded or struck out from the member 25 as indicated in Fig. 2. This portion 25f sets in an aperture in the spring member 28. With this arrangement, the spring member may be quickly attached to or released from the corresponding pivot 23 and held in assembled relation by the head 23b thereof. When these parts are assembled, the lug 25f is brought into registry with the aperture in the spring member which will be moved with the indicator member thereafter.

In the use of the device, when the operator of the calculating machine determines where the decimal point for his total or result should be placed, it is a simple matter to move the proper finger 25e to decimal indicating position which will show the decimal in its desired relative position and in a position corresponding to that which it would occupy in printed or typed numbers so that subsequent reading of the indicated total with the decimal point properly positioned will be a simple matter.

It will be apparent that these indicators may be quickly and easily disassembled from the casing to permit cleaning or refinishing of the interior thereof and likewise can be quickly and easily reassembled.

The elements are economical to manufacture as well as to assemble and have marked simplicity in construction and operation.

It will be apparent that my invention is susceptible of modification and improvement, and I do not wish to be restricted to the form shown and described except as limited thereto by the appended claims.

What I claim is:

1. In combination, a casing for calculating machines, said casing being provided with numeral openings and decimal openings spaced therefrom and disposed adjacent thereto, a pivot secured to the under side of said casing, an indicating member rotatably mounted on said pivot and provided with an indicating portion movable to and from alignment with a decimal opening, said indicating member also being provided with a finger portion protruding through said casing, and a spring member carried by said pivot and bearing against said indicating member yieldingly to resist movement thereof.

2. In combination, a casing for calculating machines, said casing being provided with numeral openings and decimal openings adjacent thereto, a pivot secured to the under side of said casing, an indicating member rotatably mounted on said pivot and provided with an indicating portion movable to and from alignment with a decimal opening, said indicating member also being provided with a finger portion protruding through said casing, and a spring member carried by said pivot and bearing against said indicating member yieldingly to resist movement thereof, said pivot being provided with a shoulder and said spring member being apertured for engagement with said shoulder.

3. In combination, a casing for calculating machines, said casing being provided with numeral openings and with decimal openings adjacent thereto, a mounting plate secured to the under side of said casing, a pivot carried by said mounting plate, an indicating member rotatably mounted upon said pivot and provided with an indicating portion movable into and out of alignment with a decimal opening, said pivot being also provided with an engageable portion, and a spring leaf apertured for engagement with said portion and bearing upon said indicating member frictionally to resist movement thereof.

4. In combination, a casing for calculating machines, said casing being provided with numeral openings and with decimal openings adjacent thereto, a pivot carried by said casing, an indicating member rotatably mounted upon said pivot and provided with an indicating portion movable into and out of alignment with a decimal opening, said pivot being also provided with an engageable portion, and a spring leaf apertured for engagement with said portion and bearing upon said indicating member frictionally to resist movement thereof, said indicating member and spring being provided with interengaging means whereby rotation of the former will be imparted to the latter.

5. The combination of a calculating machine casing having a plurality of numeral wheel sight openings, a smaller decimal point indicator opening adjacent the lower left-hand corner of each of said numeral wheel sight openings, and a third opening associated with each of said decimal point indicator openings; and a plurality of decimal indicators disposed interiorly of and secured to said casing respectively adjacent each of said groups of three openings, each said decimal indicator having a neutrally colored portion normally disposed below and viewable through the associated decimal point indicator opening, one part of said neutrally colored portion being distinctively colored and normally disposed out of alignment with said decimal point indicator opening, and a portion of each said decimal indicator extending upwardly through the associated third opening for selective manual operation to move the decimal indicator to bring said distinctively colored part into visual alignment with said decimal point indicator opening to indicate a decimal point in the same physical relationship to said numeral wheel sight openings and the numeral wheel values seen therethrough as it would occupy in the printing or writing of said values.

6. In combination, a casing for calculating machines, said casing being provided with numeral openings and decimal openings adjacent thereto, a pivot secured to the under side of said casing, an indicating member rotatably mounted on said pivot and provided with an indicating portion movable to and from alignment with a decimal opening, said indicating member also being provided with a finger portion protruding through said casing, and a spring member carried by said pivot and bearing against said indicating member yieldingly to resist movement thereof, said indicating member and spring being provided with interengaging means whereby rotation of the former will be imparted to the latter.

FREDERICK A. NIEMANN.

REFERENCES CITED

The following references are of record in the file of this patent:

UNITED STATES PATENTS

| Number | Name | Date |
|---|---|---|
| 289,566 | Samuel | Dec. 4, 1883 |
| 521,983 | Lawrence et al. | June 26, 1894 |
| 566,617 | Patterson | Aug. 25, 1896 |
| 1,000,026 | Lewis | Aug. 8, 1911 |
| 1,055,390 | Finkel et al. | Mar. 11, 1913 |
| 1,115,953 | Mays | Nov. 3, 1914 |
| 1,514,688 | Dance | Nov. 11, 1924 |
| 1,776,433 | Harstick | Sept. 23, 1930 |
| 1,789,890 | Agrell | Jan. 20, 1931 |
| 2,028,540 | Friden | Jan. 21, 1936 |
| 2,063,962 | Turck | Dec. 15, 1936 |
| 2,271,240 | Avery | Jan. 27, 1942 |
| 2,329,180 | Boyd | Sept. 14, 1943 |